(12) United States Patent
Mu et al.

(10) Patent No.: US 6,604,203 B1
(45) Date of Patent: Aug. 5, 2003

(54) ARRANGEMENT AND METHOD FOR SELF-SYNCHRONIZATION DATA TO A LOCAL CLOCK

(75) Inventors: Fenghao Mu, Linköping (SE); Christer Svensson, Ljungsbro (SE)

(73) Assignee: Switchcore, A.B., Lund (SE)

( * ) Notice: Subject to any disclaimer, the term of this patent is extended or adjusted under 35 U.S.C. 154(b) by 0 days.

(21) Appl. No.: 09/394,376

(22) Filed: Sep. 10, 1999

(30) Foreign Application Priority Data

Sep. 11, 1998 (SE) .............................................. 9803100

(51) Int. Cl.[7] ................................................ H04L 7/10
(52) U.S. Cl. ...................... 713/400; 713/400; 713/500; 713/600; 714/700; 714/731
(58) Field of Search ................................ 713/400, 500, 713/600; 714/700, 731

(56) References Cited

U.S. PATENT DOCUMENTS

| 4,370,648 | A |   | 1/1983  | Wagner et al. |
|-----------|---|---|---------|---------------|
| 4,851,710 | A |   | 7/1989  | Grivna |
| 4,943,984 | A |   | 7/1990  | Pechanek et al. |
| 5,004,933 | A | * | 4/1991  | Widener ...................... 307/269 |
| 5,228,138 | A |   | 7/1993  | Pratt et al. |
| 5,359,630 | A |   | 10/1994 | Wade et al. |
| 5,369,417 | A |   | 11/1994 | Tanaka |
| 5,692,166 | A | * | 11/1997 | Milhizer et al. ............. 395/551 |
| 5,742,188 | A | * | 4/1998  | Jiang et al. .................... 327/99 |

* cited by examiner

Primary Examiner—Thomas Lee
Assistant Examiner—Nitin C. Patel
(74) Attorney, Agent, or Firm—Coudert Brothers LLP

(57) ABSTRACT

An arrangement and a method for synchronizing data to a local clock. The invention incorporates a self-tested self-synchronous two-phase input port, wherein a line or an element of parallel data is tested for data read failure using two different phases or edges of the local clock. If a data read failure is detected using one phase, the other of the two phases is selected for reading the data. The arrangement includes a data read device for reading parallel elements of the data stream using one of two different phases or edges of the local clock, a data read error detecting device arranged to sample at least one element of the data stream using the two different phases or edges of the local clock, and a decision making device.

15 Claims, 4 Drawing Sheets

ARRANGEMENT AND METHOD FOR SELF-SYNCHRONIZATION DATA TO A LOCAL CLOCK

FIELD OF THE INVENTION

The present invention relates to an arrangement and a method for synchronising data to a local clock. The invention is useful in transferring data between sub-systems. The invention incorporates a self-tested self-synchronous two-phase input port by means of which a line or an element of parallel data is tested for data read failure using two different phases or edges of the local clock. If a data read failure is detected the other of the two phases is selected for reading the data.

STATE OF THE ART

As the clock frequency on silicon chips increases, the clock phase becomes more difficult to calculate or predict. To avoid data read failure, global clock synchronisation is commonly used to keep a system working synchronously. However, the global synchronisation for example implemented with a balanced clock tree has many drawbacks. First, it needs more metal layers resulting in high costs. Second, the power dissipation for the clock distribution network is very large and for some state-of-the-art designs of microprocessors the power consumed by the clock network ranges from 18–40% of the total power. In addition, systems do not scale well because of constraints of timing. Furthermore, a PLL or DLL is needed to compensate for the propagation delay of the local clock driver, and significant effort is required to cope with delay and skew reductions. As for the system scaling and clock frequency, physical limits will eventually be reached for the future high-performance ULSI design unless we can avoid the global synchronisation.

The present invention relates to self-tested self-synchronisation implemented with a two-phase input port for high performance ULSI design. An input signal with unknown delay can be correctly latched without suffering from data read failure.

The idea of the method is to use the same clock frequency but with an arbitrary local phase in each sub-system, and it automatically selects a clock edge for sampling data so that an error free parallel data transfer is achieved. The self-synchronization may be accomplished with the help of inserting a test signal and the error status of test signal is used to select a clock edge or clock phase to get error free parallel data transfer between sub-systems. By this method, the global clock synchronization is avoided, so there is no need for a balanced tree for the clock distribution and skew reduction techniques. Therefore, significant simplification is achieved by this invention. The power consumed by the clock distribution is efficiently reduced because there is no need of using wide metal wires to shorten the delay, and it is more suitable to use distributed clock drivers in each sub-system.

SUMMARY OF THE INVENTION

Thus, the present invention relates to an arrangement for synchronising an incoming stream of data to a local clock.

According to the invention, the arrangement comprises a data read means for reading parallel elements of the data stream using one or two different phases or edges of the local clock, a data read error detecting means arranged to sample at least one element of the data stream using the two different phases or edges of the local clock, and a decision making means. If the data read error detecting means detects a data read error using one of the two different phases of the local clock, the other phase or edge of the local clock is selected by the decision making means for reading the parallel elements.

Preferably, said one element of the data stream is a special test signal having a fixed data pattern.

The invention also relates to a method for synchronizing an incoming stream of data to a local clock.

BRIEF DESCRIPTION OF THE DRAWINGS

The invention will be described in detail below with reference to the accompanying drawings in which.

DETAILED DESCRIPTION OF PREFERRED EMBODIMENTS

Figure 1A:
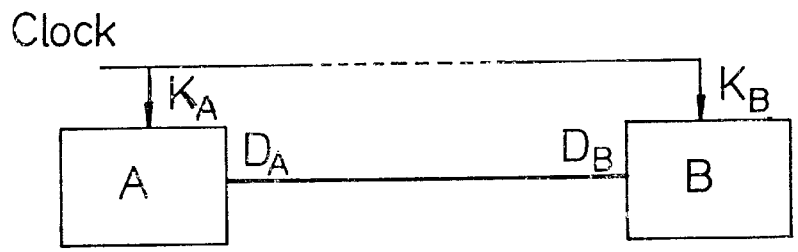
FIG. 1A is a schematic diagram of the prior art arrangement for data transfer.

In FIG. 1A, data transfer using global synchronisation is schematically shown. The same clock K is used by the two units A and B for the data transfer therebetween. However, since the time delay of the dated transfer is not known the clock is received as two different clocks $K_A$ and $K_B$ at unit A and unit B, respectively, with an unknown time relation between the local clock $K_B$ and the received data $D_B$. The present invention relates to a synchronisation arrangement solving this problem and located in unit B.

In the following, we describe the principle of the invention and its implementation by a two-phase input port. We first introduce a failure zone concept and a failure detection method, and then apply them to the port self-synchronisation. Since influence of noise, etc. will worsen the synchronisation in parallel data transfer, an improved method which injects an artificial jitter in the test signal is presented to make the self-synchronisation more robust and reliable.

In the following sections, we will focus on the issue of how to get error free parallel data transfer between sub-systems by a two-phase input port.

The failure zone is defined as a forbidden time window for the half swing transient point (HSTP) of the input signal. When the input reaches HSTP within the failure zone, edge triggered flip-flops or latches may malfunction because of metastability.

Figure 1B:
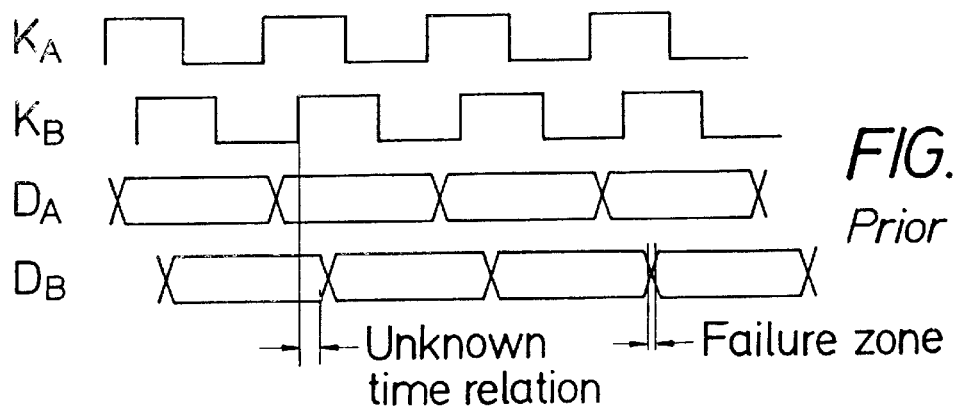
FIG. 1B is a time diagram illustrating signal wave forms of the signals in FIG. 1A.

A failure zone is shown in FIG. 1B. Typically, data is sampled at the receiving unit B by means of a data latch or flip-flop having the characteristic of copying its input signal to its output at one of the clock edges, e.g. the positive edge. There will be a problem if data is changed at or near the clock edge, i.e. the clock edge falls within the failure zone. In this case a data read error may occur.

As many factors, such as process variation, parasitic parameters, fluctuations in power supply, etc. will affect the delay, the timing relation between input and clock is not easy to predict accurately in ULSI designs. In the worst case the timing relation can be considered as a random variable, which will be determined after the chip is fabricated. In addition, temperature and supply voltage etc. change during operation, which also impacts the status of the parallel data transfer. A phase margin is needed to protect the error free parallel data transfer. If the delay time within a clock cycle is uniformly distributed, the probability of data read failure is related directly to the failure zone.

Assume that the distance is large between two sub-systems where parallel data transfer is needed. We also suppose that a clock $\phi_{J0}$ and its reverse $\phi_{J1}$ are available in the receiving sub-system B. If the HSTP of input falls into the failure zone a data read failure will occur. In order to detect the data read failure, either one element of the parallel data or a test signal going along with the parallel data is used. (When the dimension of the parallel data m is large, adding an extra test signal is fully acceptable. A square pulse sequence of a fixed pattern at half of the clock frequency may be used as the test signal.) An architecture of self-tested selfsynchronisation implemented with two-phase input ports is illustrated in FIG. 2.

Figure 2:
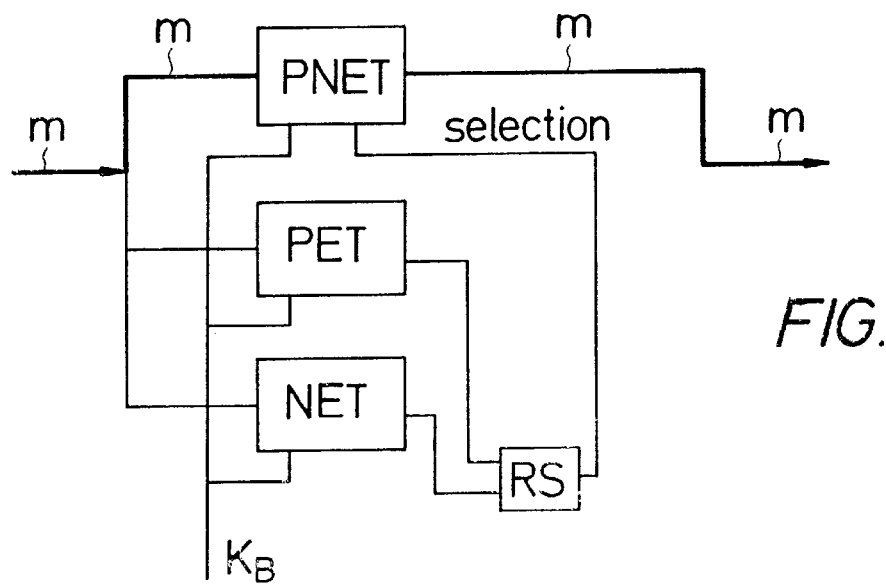
FIG. 2 is a schematic diagram of a first embodiment of an arrangement of the present invention.

In FIG. 2, a preferred embodiment of the present invention is shown. The arrangement comprises a data read unit PNET having the capability of sampling data triggered either by a positive or a negative clock edge. The arrangement also comprises a data read error detecting means having two data read detection circuits or devices PET and NET, which are also referred to herein as decision error detection devices. The detection units are connected to an RS flip-flop, the output of which is connected to the data read unit PNET. Parallel data m is received by the data read unit PNET. The units are clocked by a common clock $K_B$ which may be received from the transmitting unit A, as in FIG. 1A, but because of time delay is considered a local clock.

The function of this arrangement is as follows. One of the elements of the incoming data word $D_B$, called $D_{B1}$, is sampled at the positive as well as the negative edge of the local clock $K_B$ by the circuits PET and NET, respectively. Each of these units has an output indicating if a data read or decision error has occurred. If no data read errors occur one of the two possible clock edges is selected by the decision means RS. The selected clock edge is then used for sampling the input data $D_{B1} \ldots D_{Bm}$ using the RS flip-flop. However, if one of the two units PET and NET detects a data read error, the flip-flop RS selects the clock edge at which the data read error was not detected using the flip-flop RS. Then this output is error free. This clock edge is again used for sampling the incoming data by way of the unit PNET. If all the elements of the incoming data word have the same time relationship to the local clock $K_B$ all the elements will be error free.

In practice it may happen that the time relation between the incoming data words and the local clock changes with time. If initially there is no data read error but the actual point of time for change of data is located very near the currently used clock edge, then the change of the time relation may lead to a data read error occurring at the unit which is currently used for sampling data. In this case, the unit RS will immediately switch to the clock edge which is not indicating any error. Thereafter, the time of the data change is as far as possible from the clock edge which may cause error, which results in that the probability of a second error to occur is minimal. Thus, we can conclude that one error at the maximum can be expected to occur during operation of the arrangement according to the invention. A single error is not a serious problem since it may be corrected by ordinary coding and error correction methods.

In practice, another case may occur, namely that the different elements $D_M$ of the data word have varying time relations to the local clock. If initially there is no data read error in the error detecting units but the actual point of time for data change is located very near the currently used clock edge, then a deviating time relation of the other elements of the data word may lead to a data read error in some of these elements but not in the data stream passed through the data error detection units. Such a data read error is not detected but may give rise to a sequence of errors in the output data. This condition may be corrected by an improved embodiment of the present invention. The improvement involves an enlarged time window around the clock edge within which a data change gives rise to a data read error. This enlarged time window of the error detecting units is larger than the time windows of the other data read unit PNET. In this way a safe zone is created within which the other elements of the data word may deviate without causing a data read error, in those cases where a data read error is not caused in the element sampled by the error detecting units.

One way to create a safe zone according to the present invention is to inject a jitter signal on the data or clock input to the error detection means. The effect of the jitter signal is to displace the edge of the data or clock signal from its nominal value within a certain interval which is equal to an enlargement of the time slot around which a data change gives rise to a decision error.

Figure 3A:
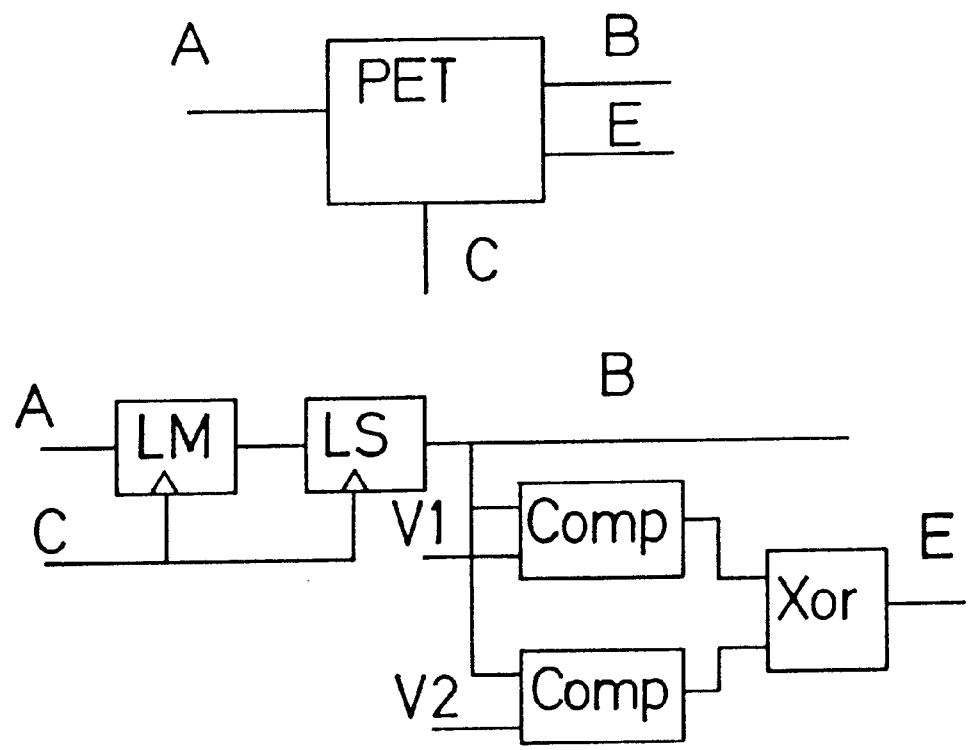
FIG. 3A is a schematic diagram of a first embodiment of a detection circuit of the present invention.
Figure 4:
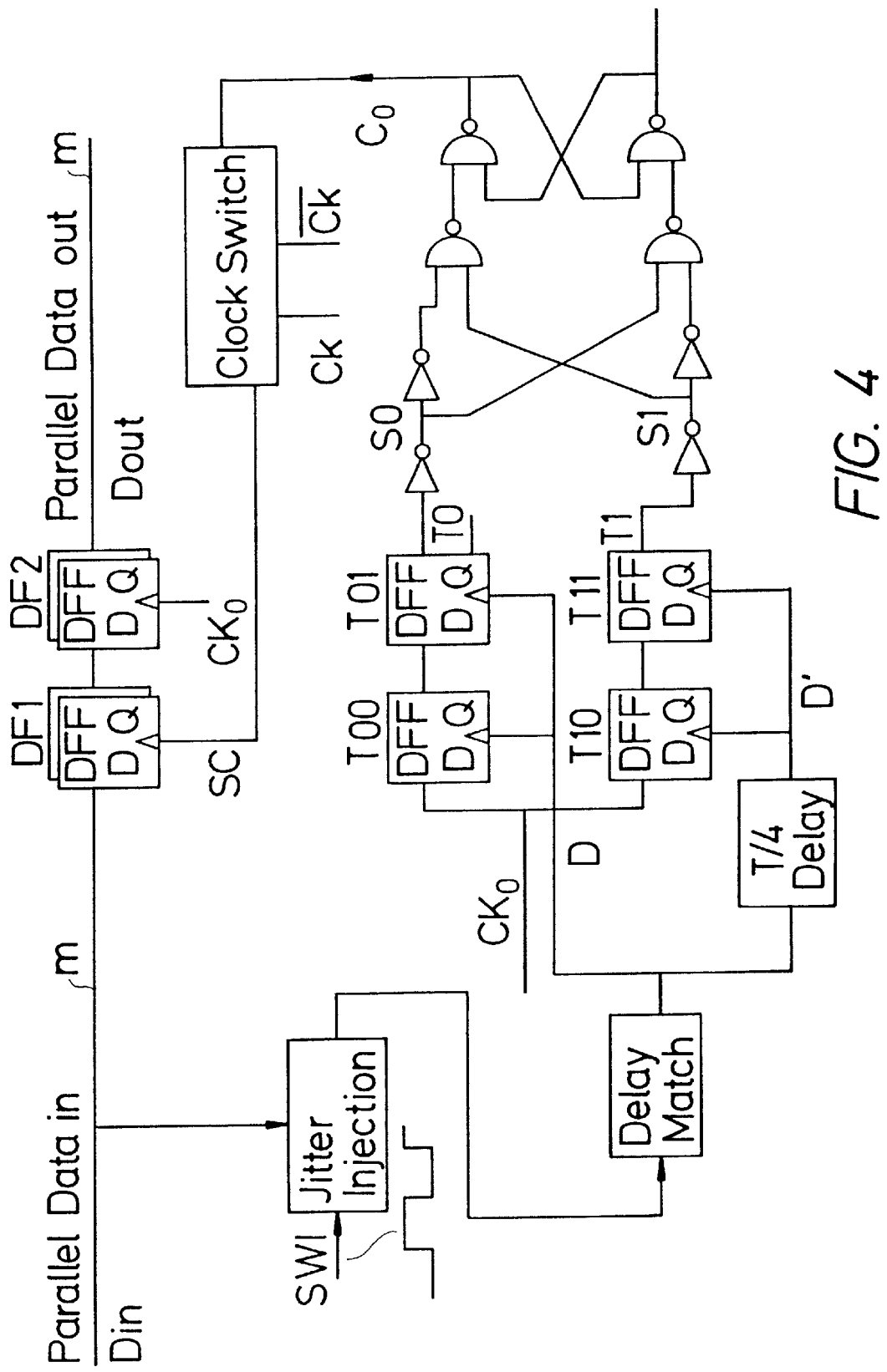
FIG. 4 is a schematic diagram of a second embodiment of a detection circuit of the present invention and FIG. 5 is a schematic diagram of a third embodiment of an arrangement of the present invention.
Figure 5:
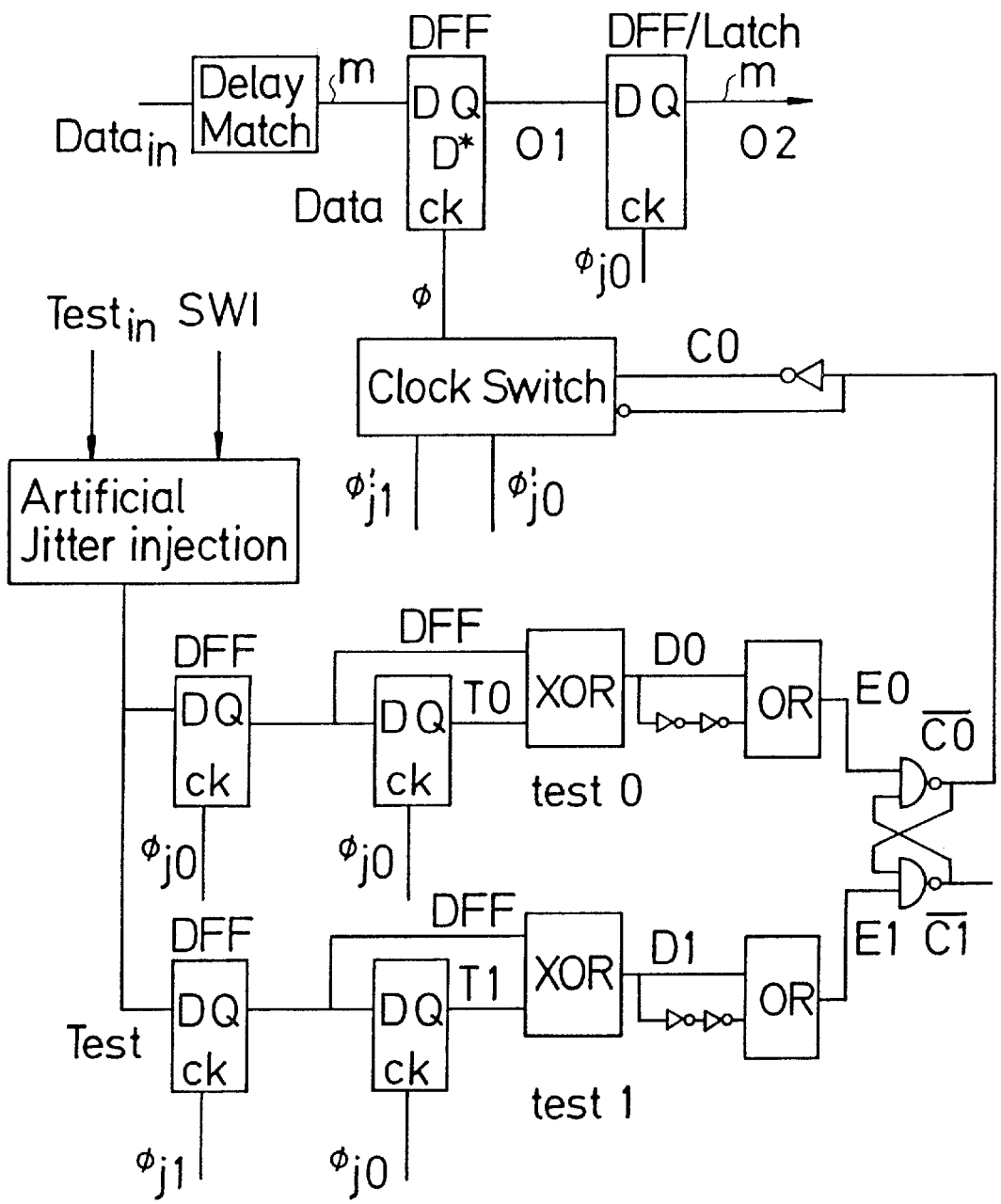

Three embodiments of decision units having the capability to detect decision errors according to the present invention are shown in FIGS. 3A, 4, and 5, respectively.

Figure 3B:
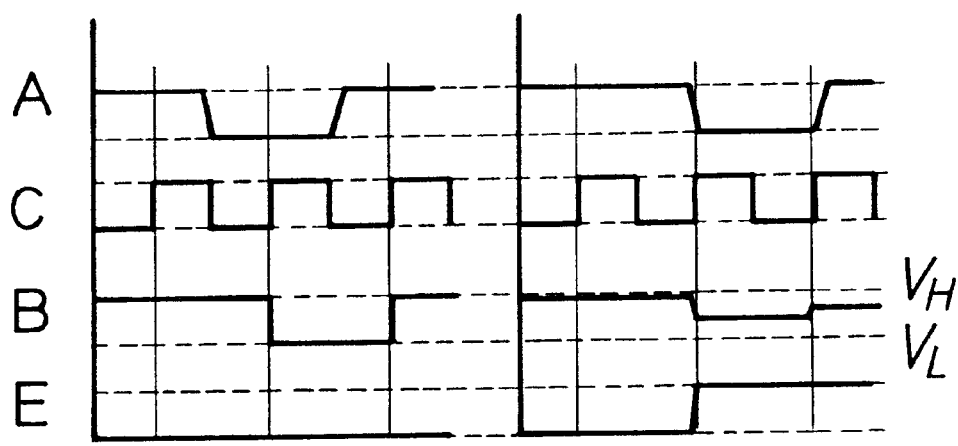
FIG. 3B is a time diagram illustrating signal wave forms of the signals in FIG. 3A.

The embodiment shown in FIG. 3A employs data flip-flops (DFFs) consisting of two dynamic latches LM and LS, which are preferably D flip-flops. When a decision error occurs, the output of the last latch LS will take a value not equal to logical one or zero as shown in the wave form diagram of FIG. 3B. This situation may be detected by means of two comparators Comp having switch voltages V1 and V2, where VL<V1<V2<VH, VL representing logical zero and VH representing logical one. If the outputs of the comparators are different, this means that a decision error has occurred.

Another embodiment of the data read or decision error detection unit is shown in FIG. 4. Here the data signal D and a delayed version D' of the data signal catch the clock by means of two flip-flops. Their outputs, T0 and T1, contain information about whether there is a clock edge between the edges of D and D' which information may be extracted by means of a logic network. By applying a suitable delay, this detection window can be made to coincide with the window of the data collecting flip-flops that cause the decision error.

A further development of the present invention is described below with reference to FIG. 5.

Assume that the local clock phase used to trigger the parallel data is $\phi_{J0}$. To guarantee error free parallel data transfer, the test signal is fed into two paths labeled with $test_0$ and $test_1$, respectively. Each path consists of two DFFs and a failure detection circuit. The two test paths are identical except the different clock phases used in the first DFFs labeled with $\phi_{J0}$ and $\phi_{J1}$. The phase $\phi_{J1}$ is the inverted $\phi_{J0}$, so if a data read failure occurs in one test path the other will be error free. The failure detectors detect any potential failure during data read. A decision C is made by checking the present and historical states of being erroneous among the two test paths. C is used to control a clock switch in which a clock phase is selected to obtain the error free parallel data transfer.

The flip-flop marked with D* is inserted to retime the parallel data. If the HSTP of the incoming test signal falls in the failure zone, another clock phase will be selected to trigger. A suitable phase φ must be found to trigger D* so that the error free parallel data transfer is obtained for both the flip-flop and the next latch.

To become more robust, an artificial jitter injection is employed. The artificial jitter blurs the edges of test signal so that if this blurred test signal can pass, the data transfer is more safe. In effect, this may be viewed as an enlarged time window of detecting a data read error.

The artificial jitter may be a low frequency square wave pulse sequence. The jitter injection can guarantee that in the worst case only one error may possibly occur after a system starts to work.

The present invention also makes it possible to eliminate the influence the impact of temperature shift. Initially, when the system is cold and just started, an additional jitter signal having a relatively large amplitude is injected. The amplitude is selected such that the edge of the data or clock signal is displaced within an interval which is larger than the largest expected temperature shift. When the system has been warmed up, the jitter injection is decreased to a lower amplitude or stopped completely. Thus, if the additional jitter causes a larger "disturbance" than the temperature shift, the data transfer will not be effected by the temperature shift.

Thus, the present invention provides an arrangement and a method for synchronising data to a local clock in parallel data transfer between two sub-systems with arbitrary clock phase. The method of self-tested self-synchronisation of the invention removes the requirements of global synchronisation and the constraints on clock skew. The arrangement is also more robust if a proper artificial jitter is injected.

The present invention provides a solution to the problem of synchronisation for large ULSI systems, in which there is no need for a dedicated delay matching in the clock distribution, for clock deskew by DLL or PLL in each sub-system, or for the constraints on the delay of the parallel data transfer. The clock can be arbitrarily distributed and the power consumption caused by the clock distribution and the peak current resulting from synchronous switching will be reduced. There is no limitation on the scale of the systems. In addition, the mechanism of the invention makes design and design automation much easier. By the method of the invention, parallel data transfer can reach full speed so maximum throughput can be obtained.

The present invention has been described in great detail with reference to the preferred embodiments. The scope of the invention is only limited by the claims below.

What is claimed is:

1. An apparatus for synchronizing an incoming stream of data, comprising parallel data elements, to a local clock for reading of said parallel data elements by a data read device, said apparatus comprising:
   a) a data read error detecting device comprising a first error detection circuit for sampling at least one element of said incoming stream of data at a first clock edge of said local clock and for detecting whether a data read error has occurred while sampling at said first clock edge, and a second error detection circuit for sampling said at least one element at a second clock edge of said local clock and for detecting whether a data read error has occurred while sampling at said second clock edge, wherein each said error detection circuit comprises:
      a first circuit for sampling said at least one element at one said clock edge, said first circuit including a data flip-flop that outputs a first signal value during the sampling by said first circuit;
      a second circuit coupled to said first circuit for using said first signal value to generate an error signal when said data read error has occurred, said second circuit comprising a first and second comparator circuit for comparing said first signal value to a first and second switch voltage, respectively, and for outputting a first and second comparator output result, respectively, and an exclusive-or logic device for generating said error signal when said first and second comparator output results are different; and
   b) a decision making device coupled to said data read error detecting device for using said error signal to select one said clock edge, wherein if a data read error is detected while sampling said at least one element using one said clock edge, said decision making device selects the other clock edge for reading of said parallel data elements by said data read device.

2. An apparatus according to claim 1, wherein said first error detection circuit samples said at least one element at a positive clock edge of said local clock, and said second error detection circuit samples said at least one element at a negative clock edge of said local clock.

3. An apparatus according to claim 2, wherein said first signal value changes during the time period between two consecutive positive or negative clock edges.

4. An apparatus according to claim 1, wherein said error signal is equal to a logical one when said first and second comparator output results are different.

5. An apparatus according to claim 1, wherein said decision making device includes an RS flip-flop coupled to said first and second error detection circuits.

6. An apparatus for synchronizing an incoming stream of data, comprising parallel data elements, to a local clock for reading of said parallel data elements by a data read device, said apparatus comprising:
   a) a data read error detecting device comprising:
      a first error detection circuit for sampling at least one element of said incoming stream of data at a first clock edge of said local clock, for detecting whether a data read error has occurred while sampling at said first clock edge, and for outputting a first error signal; and
      a second error detection circuit for sampling said at least one element at a second clock edge of said local clock, for detecting whether a data read error has occurred while sampling at said second clock edge, and for outputting a second error signal, said second error detecting circuit including a delay circuit for causing said at least one element to be sampled after a predetermined delay;
   b) a decision making device that includes an RS flip-flop coupled to said first and second error detection circuits for using said first and second error signals to select one said clock edge, wherein if a data read error is detected while sampling said at least one element using one said clock edge, said RS flip-flop selects the other clock edge for reading of said parallel data elements by said data read device; and
   c) a jitter injection circuit coupled to said data read error detecting device for causing said at least one element to be sampled using a wider time window than the time window used by said data read device for reading said parallel data elements.

7. An apparatus for synchronizing an incoming stream of data, comprising parallel data elements, to a local clock for reading of said parallel data elements by a data read device, said apparatus comprising:

a) a data read error detecting device comprising:

a first error detection circuit for sampling a test signal having a fixed data pattern at a first clock edge of said local clock, for detecting whether a data read error has occurred while sampling at said first clock edge, and for outputting a first error signal;

a second error detection circuit for sampling said test signal at a second clock edge of said local clock, for detecting whether a data read error has occurred while sampling at said second clock edge, and for outputting a second error signal;

b) a decision making device that includes an RS flip-flop coupled to said first and second error detection circuits for using said first and second error signals to select one said clock edge, wherein if a data read error is detected while sampling said test signal using one said clock edge, said RS flip-flop selects the other clock edge for reading of said parallel data elements by said data read device; and c) a jitter injection circuit coupled to said data read error detecting device for causing said test signal to be sampled using a wider time window than the time window used by said data read device for reading said parallel data elements.

8. A method for synchronizing an incoming stream of data, comprising parallel data elements, to a local clock for reading of said parallel data elements by a data read device, said method comprising the steps of:

a) causing at least one element of said incoming string of data to be sampled at a first and at a second clock edge of said local clock;

b) causing a first signal value to be generated that is a function of the sampling of said at least one element;

c) causing said first signal value to be compared to a first switch voltage and to a second switch voltage, for detecting whether a data read error has occurred; and d) causing an error signal to be generated if step (c) indicates that a data read error has occurred, and using said error signal to select one said clock edge, wherein if a data read error is detected while sampling said at least one element using one said clock edge, said decision making device selects the other clock edge for reading of said parallel data elements by said data read device.

9. A method according to claim 8, wherein said at least one element is sampled at a positive and at a negative clock edge of said local clock.

10. A method according to claim 9, wherein said first signal value changes during a time period between two consecutive positive or negative clock edges.

11. A method according to claim 8, wherein said error signal is equal to a logical one when said data read error has occurred.

12. A method for synchronizing an incoming stream of data, comprising parallel data elements, to a local clock for reading of said parallel data elements by a data read device, said method comprising the steps of:

a) causing at least one element of said incoming stream of data to be sampled at a first clock edge of said local clock, detecting whether a data read error has occurred while sampling at said first clock edge, and causing a first error signal to be generated if a data read error is detected;

b) causing said at least one element of said incoming stream of data to be sampled at a second clock edge of said local clock after a predetermined delay, detecting whether a data read error has occurred while sampling at said second clock edge, and causing a second error signal to be generated if a data read error is detected; and c) causing a clock edge to be selected using an RS flip-flop, wherein said second clock edge is selected if said first error signal is generated, and said first clock edge is selected if said second error signal is generated, wherein said at least one element is sampled using a wider time window than the window used by said data read device for reading said parallel data elements.

13. A method according to claim 12, wherein a jitter signal is used to generate said wider time window.

14. A method for synchronizing an incoming stream of data, comprising parallel data elements, to a local clock for reading of said parallel data elements by a data read device, said method comprising the steps of:

a) causing a test signal having a fixed data pattern to be sampled at a first clock edge of said local clock, detecting whether a data read error has occurred while sampling at said first clock edge, and causing a first error signal to be generated if a data read error is detected;

b) causing said test signal to be sampled at a second clock edge of said local clock after a predetermined delay, detecting whether a data read error has occurred while sampling at said second clock edge, and causing a second error signal to be generated if a data read error is detected; and c) causing a clock edge to be selected using an RS flip-flop, wherein said second clock edge is selected if said first error signal is generated, and said first clock edge is selected if said second error signal is generated, wherein said test signal is sampled using a wider time window than the window used by said data read device for reading said parallel data elements.

15. A method according to claim 14, wherein a jitter signal is used to generate said wider time window.

* * * * *